US012655902B2

(12) United States Patent
Cheron et al.

(10) Patent No.: US 12,655,902 B2
(45) Date of Patent: Jun. 16, 2026

(54) SPEED REDUCER FOR A POWERTRAIN

(71) Applicant: VALEO EMBRAYAGES, Amiens (FR)

(72) Inventors: Antonin Cheron, Cergy Pontoise (FR); Christophe Dhalleine, Cergy Pontoise (FR); Philippe Kraemer, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 10 days.

(21) Appl. No.: 18/611,209

(22) Filed: Mar. 20, 2024

(65) Prior Publication Data

US 2024/0318717 A1 Sep. 26, 2024

(30) Foreign Application Priority Data

Mar. 20, 2023 (FR) ...................................... 23 02569

(51) Int. Cl.
*F16H 57/04* (2010.01)
*F16H 57/02* (2012.01)
(52) U.S. Cl.
CPC ....... *F16H 57/0423* (2013.01); *F16H 57/045* (2013.01); *F16H 57/0457* (2013.01); *F16H 57/02* (2013.01); *F16H 2057/02034* (2013.01); *F16H 57/0476* (2013.01)
(58) Field of Classification Search
CPC .... F16H 57/02; F16H 57/0423; F16H 57/045; F16H 57/0457; F16H 57/0476
See application file for complete search history.

(56) References Cited

U.S. PATENT DOCUMENTS

| | | | | |
|---|---|---|---|---|
| 874,883 | A | * | 12/1907 | Clarke .................... F16H 57/04 |
| | | | | 184/14 |
| 1,220,810 | A | * | 3/1917 | Alquist .............. F16H 57/0447 |
| | | | | 184/6.12 |
| 3,529,698 | A | | 9/1970 | Nelson |
| 9,074,679 | B2 | * | 7/2015 | Araki .................. F16H 57/0457 |
| 10,746,282 | B2 | * | 8/2020 | Ito ....................... F16H 57/0471 |

(Continued)

FOREIGN PATENT DOCUMENTS

| | | | | | |
|---|---|---|---|---|---|
| CN | 107314100 | A | * | 11/2017 | ......... F16H 57/0409 |
| CN | 112879547 | A | * | 6/2021 | ........... F16H 7/0434 |

(Continued)

OTHER PUBLICATIONS

European Office Action issued Aug. 6, 2024, in European Patent Application 24164341.0, 5 pages.

*Primary Examiner* — Adam D Rogers
(74) *Attorney, Agent, or Firm* — Oblon, McClelland, Maier & Neustadt, L.L.P.

(57) ABSTRACT

A speed reducer for a powertrain includes, in an orthogonal frame of reference: a reduction device including a first shaft extending along a first axis of rotation and coaxially carrying a first toothed wheel, and a housing with a hollow shape including a base and a peripheral wall integrally formed with the base, the peripheral wall partially surrounding the reduction device. Also included is a lubricant receiving and distributing collector arranged in the housing between the peripheral wall and the first axis of rotation. The lubricant receiving and distributing collector includes a first reservoir and a second reservoir which are arranged on either side of the first toothed wheel.

19 Claims, 7 Drawing Sheets

1 69 52 53 58 11a XY 57 53a 60 62 51 50

11 75 13 110 30

(56) References Cited

U.S. PATENT DOCUMENTS

| | | | | |
|---|---|---|---|---|
| 10,859,152 B2 * | 12/2020 | Yu | ........................ | F16H 57/0475 |
| 12,055,210 B2 * | 8/2024 | Hirata | ................. | F16H 57/0483 |
| 12,331,827 B2 * | 6/2025 | Krause | ............... | F16H 57/0457 |
| 12,429,128 B2 * | 9/2025 | Hegedus | ............. | F16H 57/0423 |
| 2011/0214947 A1 * | 9/2011 | Tuomas | .............. | F16H 57/0423 |
| | | | | 184/6.12 |
| 2024/0110622 A1 * | 4/2024 | Krause | ............... | F16H 57/0493 |
| 2024/0247711 A1 * | 7/2024 | Nagata | ............... | F16H 37/0813 |
| 2024/0337314 A1 * | 10/2024 | Liu | .................... | F16H 57/0424 |
| 2025/0172208 A1 * | 5/2025 | Liu | .................... | F16H 57/0441 |

FOREIGN PATENT DOCUMENTS

| | | | | | | |
|---|---|---|---|---|---|---|
| CN | 112943908 | A | * | 6/2021 | | |
| CN | 120251697 | A | * | 7/2025 | .......... | F16H 57/042 |
| DE | 102 54 572 | A1 | | 3/2004 | | |
| DE | 102007021686 | A1 | * | 11/2008 | ......... | F16H 57/0447 |
| EP | 4550632 | A1 | * | 5/2025 | ............. | B60K 11/02 |
| FR | 2 982 003 | A1 | | 5/2013 | | |
| GB | 1115446 | A | * | 5/1968 | .............. | F16N 7/18 |
| JP | 2015086926 | A | * | 5/2015 | ......... | F16H 57/0423 |
| WO | WO-2024133372 | A1 | * | 6/2024 | ......... | F16H 57/0423 |

* cited by examiner 1    58    60    90    50    11    10          63    40    53    90    58

61    52a   52          54a   110        X    54a          51    80    51a 1  62  61  63  56  110      13  60      50  40  59

70      63  52  58  11, 11a  X      10  51  69

1    30       120  50        X    XY   63   12   62   101

NN

60   X2       110        20   26   29   100  X3

50     52   81   82   53   56          53a

55    XY        57   54a        59        51

1   69   52   53   58   11a   XY   57   53a   60   62   51   50

11   75        13              110        30

SPEED REDUCER FOR A POWERTRAIN

TECHNICAL FIELD OF THE INVENTION

The invention relates generally to the technical field of speed reducers, in particular to their lubrication means.

PRIOR ART

To lubricate a speed reduction device, in particular the bearings, gears, etc., the reducers can be equipped with a pump which circulates a lubricant such as oil in a lubrication circuit configured to reach various specific regions to be lubricated. These devices for lubricating the reducers are referred to as "active" lubrication devices. Such a device is described, for example, in document FR2982003, in which a pump supplies oil to a gearbox via a tank acting as a reservoir within the gearbox housing. The tank supplies oil to the rotating shafts of the gearbox via a plurality of orifices. This device has the drawback of consuming energy to operate the pump and of congesting a vertical axis, given that the single reservoir of the tank is arranged above the shafts, in particular between a secondary shaft and the upper wall of the housing.

There are also so-called "passive" lubrication devices, i.e. without a pump, in which ramps are formed within the housing to promote the rise of lubricant from the bottom of the reducer to the top and thus disperse the lubricant in various regions of the reducer.

However, these passive lubrication solutions are not entirely satisfactory and the rise of lubricant from the bottom to the top of the reducer is sometimes not sufficient, in particular when elements of the reduction device, for example a transmission shaft carrying toothed wheels, impede the rise of the lubricant to the top of the reducer.

SUMMARY OF THE INVENTION

The invention aims to remedy this problem by proposing a speed reducer for a powertrain, comprising, in an orthogonal frame of reference XYZ:
  a reduction device comprising a first shaft extending along a first axis of rotation and coaxially carrying a first toothed wheel,
  a housing with a hollow shape comprising a base and a peripheral wall integrally formed with the base, the peripheral wall partially surrounding the reduction device,
  a lubricant receiving and distributing collector arranged in the housing between the peripheral wall and the first axis of rotation,
wherein the lubricant receiving and distributing collector comprises a first reservoir and a second reservoir which are arranged on either side of the first toothed wheel.

This speed reducer with its lubrication device has the advantage of recovering and distributing a large quantity of lubricant present within the speed reducer, while maintaining the principle of passive lubrication. The peripheral wall of the housing participates in the recovery of lubricant by being arranged in the vicinity of the upper part of the collector, the lubricant falling back into the collector by gravity. The lubricant receiving and distributing collector occupies a central position within the speed reducer, which enables it to receive all the lubricant projections coming from the first toothed wheel but also from other toothed wheels also present within the speed reducer.

Advantageously, the outer periphery of the first toothed wheel may extend radially beyond the outer perimeter of the first reservoir or of the second reservoir. In this way, recovery of the lubricant is facilitated.

Preferably, at least the first reservoir may comprise a cylindrical surface portion concentric with the first axis of rotation. Advantageously, the second reservoir may comprise a cylindrical surface portion concentric with the first axis of rotation. According to an alternative, the first reservoir and the second reservoir may each comprise a cylindrical surface portion concentric with the first axis of rotation. In this way, the lubricant is guided and directed from the toothing of the first toothed wheel to the collector.

Advantageously, the first reservoir and the second reservoir may be arranged on either side of a first geometric plane passing through the first axis of rotation and the second axis of the orthogonal frame of reference perpendicular to the first axis of rotation, the first geometric plane passing through the peripheral wall of the housing in a direction substantially perpendicular thereto.

Preferably, the first reservoir may comprise a first bottom and the second reservoir may comprise a second bottom, the first bottom being offset axially with respect to the second bottom along the second axis of the orthogonal frame of reference.

Preferably, the first reservoir and the second reservoir may be connected via a first gutter conveying the lubricant from the first reservoir to the second reservoir under the effect of gravity. Thus, it is possible to distribute the lubricant to various regions of the collector.

Advantageously, the first reservoir and the second reservoir may be connected via a second gutter conveying the lubricant from the first reservoir to the second reservoir under the effect of gravity, so that the first reservoir, the second reservoir, the first gutter and the second gutter form a common receptacle able to receive the lubricant projected within the housing.

Preferably, the first reservoir and the second reservoir may be connected via a first gutter and a second gutter which are separate and which distribute the lubricant indiscriminately between the first reservoir and the second reservoir under the effect of gravity, so that the first reservoir, the second reservoir, the first gutter and the second gutter form a common receptacle able to receive the lubricant projected within the housing. Thus, it is possible to distribute the lubricant to various regions of the collector.

Preferably, the first gutter and the second gutter may be spaced axially along the first axis of rotation and arranged on either side of a central opening to allow the lubricant projections coming from the toothing of the first toothed wheel to pass through.

Advantageously, the reduction device may comprise a second shaft extending along a second axis of rotation and coaxially carrying a differential input toothed wheel, the differential input toothed wheel being partially immersed in lubricant, and a deflector arranged in the housing comprising a ramp able to guide the lubricant in the direction of the first toothed wheel. The combination of the ramp and of the lubricant receiving and distributing collector comprising a central opening makes it possible to increase the quantity of lubricant recovered in the receptacle.

Preferably, the ramp may comprise a cylindrical lubricant guide surface concentric with the differential input toothed wheel and extending in the direction of the first axis of rotation of the first toothed wheel. Thus, by approaching the first axis of rotation, it is possible to cause the ramp to rise higher in the speed reducer despite the presence of a transmission shaft. This promotes the flow of the lubricant towards the top of the speed reducer. With the deflectors known from the prior art in which the deflectors are formed in the mass of the housings, the installation of the deflectors is limited and the flow of the lubricant towards the top of the speed reducer is sometimes insufficient.

Advantageously, the housing may comprise, on the inner face of the peripheral wall, at least one drip situated vertically in line with the lubricant receiving and distributing collector, the drip taking the form of a material protuberance. For example, the profile of the drip may be linear and oriented in the direction of demoulding of the housing when the latter is obtained by casting. According to another example, the drip may be cone-shaped. According to another example, the drip may be machined directly in the housing. The drip allows more lubricant to be recovered within the collector. The lubricant which trickles along the peripheral wall preferentially returns to the collector by following the shape of the drip rather than returning directly to the bottom of the speed reducer. The lubricant drops back into the collector by flowing drop by drop from the drip.

The speed reducer according to the invention may have any of the features described below combined with one another or taken independently of one another:

the first reservoir and the second reservoir are arranged on either side of a first geometric plane passing through the first axis of rotation and the second axis of the orthogonal frame of reference perpendicular to the first axis of rotation, the first geometric plane passing through the peripheral wall of the housing in a direction substantially perpendicular thereto, the first toothed wheel rotates about the first axis of rotation in a preferred direction, the first reservoir facing the first toothed wheel so as to receive the lubricant projected by the toothing. According to one example, the preferred direction of rotation of the first toothed wheel is that which allows the motor vehicle to move forward.

the peripheral wall of the housing comprises a cylindrical surface coaxial with the first axis of rotation that partially surrounds the outer periphery of the first toothed wheel.

the deflector is manufactured from a part separate from the housing and in which the ramp comprises a flow sector located at the end of the ramp and housed in the hollowed-out flank of the first toothed wheel.

the flow sector is arranged at least partially in a space in the form of a right circular cylinder centred on the first axis of rotation.

the deflector is fixed with respect to the housing.

the deflector comprises a mounting portion comprising a plurality of fixing elements cooperating with complementary fixing elements arranged in the housing of the reducer.

the first shaft coaxially carries a plurality of toothed wheels, and the flow sector is also arranged closer to the first axis of rotation than the radially outer periphery of the toothed wheel of largest diameter carried by the first shaft.

the first toothed wheel is arranged above the level of the lubricant, for example oil, in particular above the nominal level NN.

a closure cover is fitted to the housing so as to form a closed enclosure around the reduction device, the lubricant receiving and distributing collector being held in position partially by the housing and partially by the closure cover.

the closure cover comprises, on its inner face, at least one drip situated vertically in line with the collector.

the deflector is partially integral with the housing or with the closure cover.

the speed reducer comprises lubricant contained in the housing.

the lubricant receiving and distributing collector comprises at least one bottom, an outer perimeter and a central opening arranged between the first reservoir and the second reservoir, into which opening the first toothed wheel is partially inserted so as to be able to project lubricant from the toothing towards the bottom of the lubricant receiving and distributing collector, the bottom of the lubricant receiving and distributing collector completely surrounding the central opening.

The invention also relates to a powertrain comprising an electric machine and a speed reducer as described above. Where appropriate, the electric machine comprises a rotor shaft which may be coaxial and locked in rotation with the input shaft of the speed reducer.

Other features and advantages of the invention are revealed by the following description of non-limiting exemplary embodiments of the various aspects of the invention.

BRIEF DESCRIPTION OF THE FIGURES

Other features and advantages of the invention will become apparent from reading the following description, with reference to the appended figures, in which.

DETAILED DESCRIPTION OF AN EMBODIMENT

Figure 1:
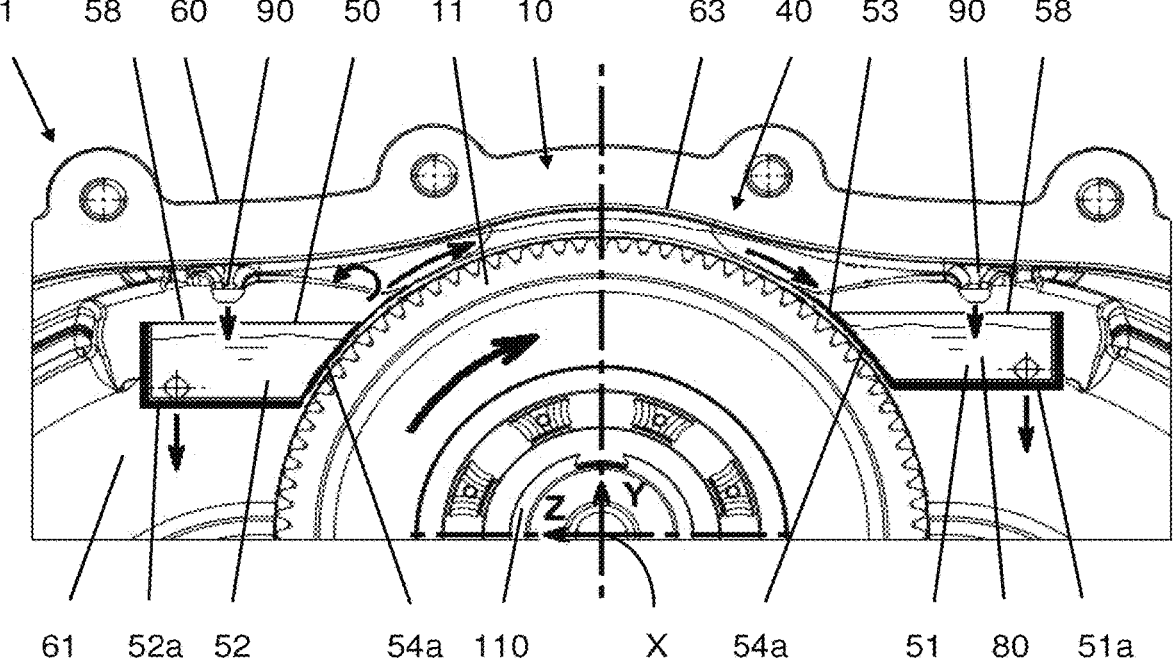
FIG. 1: illustrates a partial front view of a speed reducer according to a first embodiment, shown without the closure cover.
Figure 2:
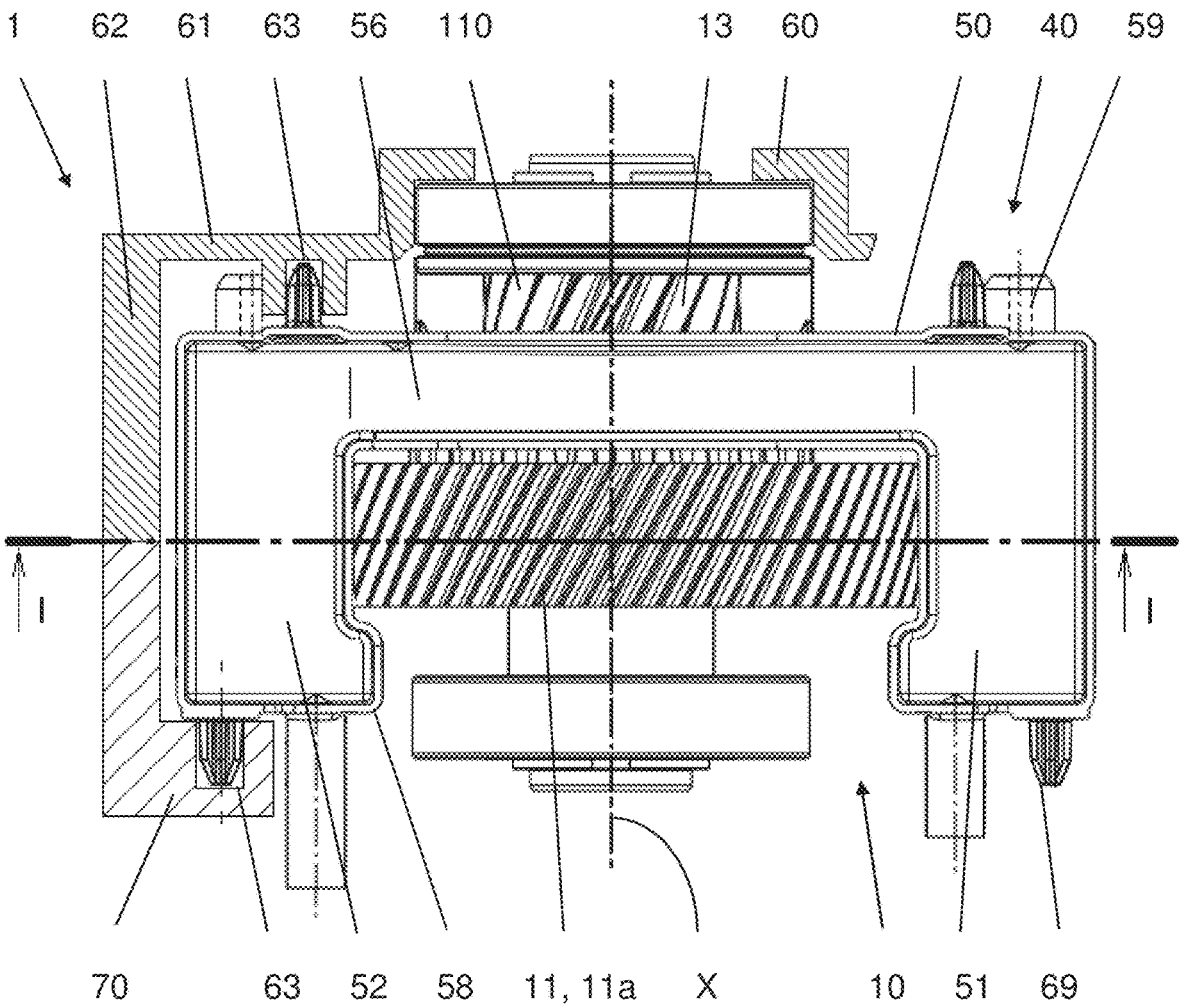
FIG. 2: illustrates a top view of the speed reducer of FIG. 1.
Figure 3:
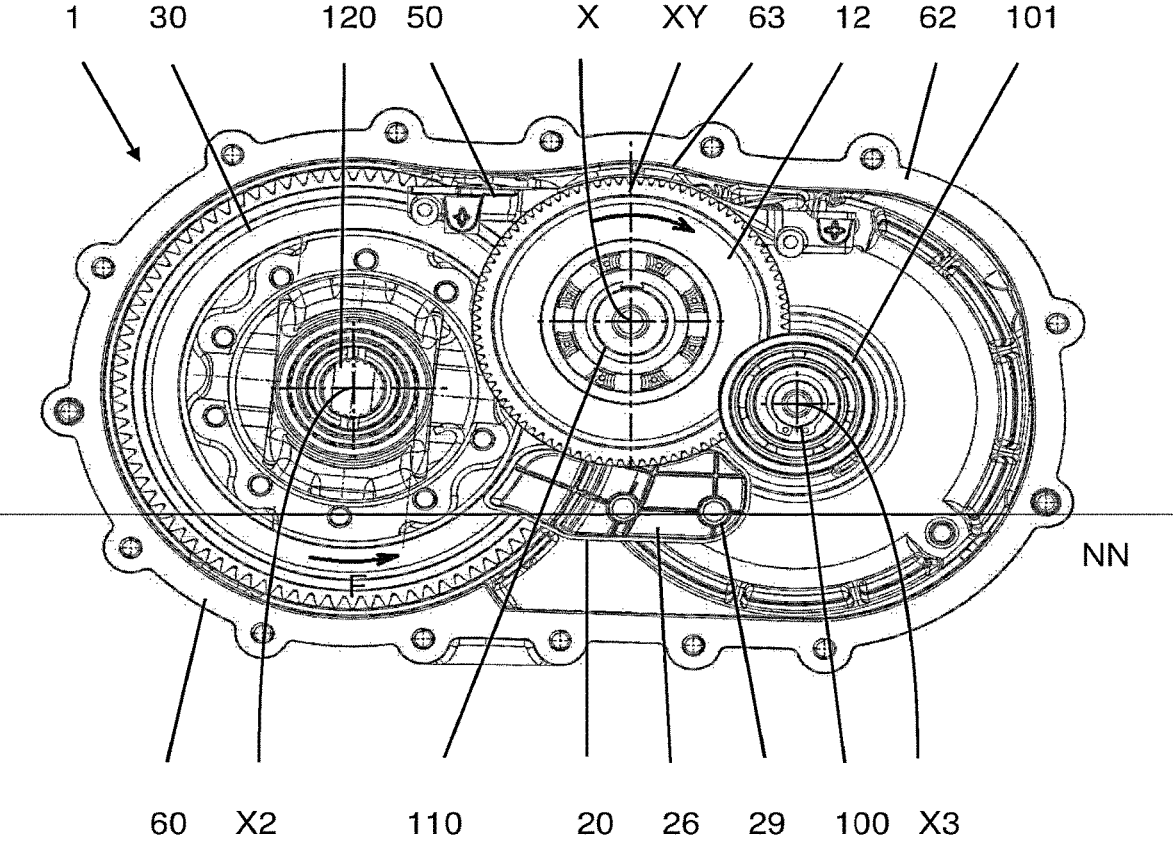
FIG. 3: illustrates a front view of a speed reducer, according to a second embodiment, shown without the closure cover.

FIGS. 1 and 2 show a motor vehicle speed reducer 1 according to a first embodiment of the invention. This speed reducer is generally integrated within a main powertrain of a vehicle, in particular an electric motor vehicle, or else a secondary powertrain. For example, this may be a secondary electric powertrain of a hybrid vehicle, in particular intended for the rear axle of the vehicle.

The speed reducer 1 comprises, in particular in an orthogonal frame of reference XYZ, a first shaft 110 extending along a first axis of rotation X and coaxially carrying a first toothed wheel 11, and a hollow housing 60 comprising a base 61 and a peripheral wall 62 integral with the base. The peripheral wall 62 partially surrounds the first toothed wheel 11. In this example, the speed reducer comprises a single speed ratio.

In the orthogonal frame of reference XYZ, the planes XY, YZ and XZ are perpendicular to one another.

In the following description, the first axis of rotation is termed axis of rotation X, the second axis of rotation is termed axis of rotation X2, and the third axis of rotation is termed axis of rotation X3.

In the description and the claims, the terms "outer" and "inner" and the orientations "axial" and "radial" will be used to denote elements of the transmission system according to the definitions given in the description. By convention, the "axial" orientation refers to the reference axes X, Y or Z or to directions parallel to these axes, and the "radial" orientation is directed orthogonally to the reference axes X, Y and Z. A "radially inner" element is located closer to the reference axis than a "radially outer" element.

The first shaft mentioned above and in the set of claims corresponds to the intermediate shaft 110 of the reduction device 10, which will be described below in the embodiments.

The terms "upper", "lower", "high", "low" and "bottom" should be considered when looking at the speed reducer in a position/inclination similar to its own when it is mounted on a vehicle parked horizontally.

FIG. 1 is a simplified front view of a speed reducer 1 according to the first embodiment of the invention shown without its closure cover so as to be able to see the interior of the speed reducer. FIG. 2 partially shows the same speed reducer 1 in a top view.

In FIG. 1, the speed reducer is shown in a position corresponding to its position when it is mounted in a vehicle parked on a horizontal plane. It comprises a relatively low part and a relatively high part.

The reduction device 10 generally comprises:

an input shaft 100 intended to be driven by a motor, in particular an electric machine, about a third axis of rotation X3, a second shaft 120 extending along a second axis of rotation X2 and coaxially carrying a differential input wheel 30, and also a differential axle capable of rotating two half-shafts about a second axis of rotation X2, an intermediate shaft 110 movable in rotation about the first axis of rotation X, and capable of transmitting a torque between the input shaft 100 and the differential input toothed wheel 30.

The reduction device 10 is generally housed in a closed enclosure formed by the housing 60 and a closure cover 70 fitted to the housing.

In order to improve the lubrication within the speed reducer 1, the latter comprises in particular a lubrication device 40 comprising:

a lubricant receiving and distributing collector 50 comprising at least one bottom 51a and an outer periphery 58;

the first toothed wheel 11, which is movable in rotation about the first axis of rotation X;

wherein the collector 50 comprises a notch into which the first toothed wheel 11 is partially inserted so as to be able to project lubricant from the toothing towards the collector.

The lubricant receiving and distributing collector 50 is arranged in the housing 60 between the peripheral wall 62 and the first axis of rotation X. This collector 50 has the particular feature of comprising a first reservoir 51 and a second reservoir 52 which are arranged on either side of the first toothed wheel. In particular, the first reservoir 51 and the second reservoir 52 are arranged on either side of a first geometric plane XY passing through the first axis of rotation X and the second axis Y of the orthogonal frame of reference perpendicular to the first axis of rotation X, the first geometric plane XY passing through the peripheral wall 62 of the housing in a direction substantially perpendicular thereto. The lubricant receiving and distributing collector 50 is held in position partially by the housing 60 and partially by the closure cover 70.

In order to make the speed reducer more compact, the peripheral wall 62 of the housing 60 comprises a cylindrical surface 63 coaxial with the axis of rotation X that partially surrounds the outer periphery of the first toothed wheel. The second axis Y then defines a normal to the cylindrical surface 63.

FIG. 1 illustrates the lubrication of this reduction device, which is partially achieved by the projection of lubricant (represented by the black arrows), for example oil 80, conveyed by the first toothed wheel. The oil coming from the bottom of the reducer is raised upwards by means of the rotation of the first toothed wheel, and is then projected towards the peripheral wall 62 and in the direction of the first reservoir 51. Given that the outer periphery 11a of the first toothed wheel 11 extends radially beyond the outer perimeter 58 of the first reservoir and of the second reservoir, the lubricant can easily fall back into the collector.

The first toothed wheel 11 rotates about the first axis of rotation X in a preferred direction. In this example, the preferred direction of rotation of the first toothed wheel is that which allows the motor vehicle to move forward. The first reservoir 51 facing the first toothed wheel 11 receives the lubricant projected by the toothing. Another portion of the lubricant also falls back into the second reservoir 52.

The first reservoir 51 comprises a first bottom 51a and the second reservoir 52 comprises a second bottom 52a, the first bottom being offset axially with respect to the second bottom along the second axis Y of the orthogonal frame of reference.

As illustrated in FIG. 2, the first reservoir 51 and the second reservoir 52 are connected via a first gutter 56 conveying the lubricant from the first reservoir to the second reservoir under the effect of gravity. Thus, it is possible to distribute the lubricant to various regions of the collector. In this example, the collector is U-shaped. The two reservoirs 51, 52 extend parallel to the axis of rotation X. The lubricant receiving and distributing collector 50 comprises a plurality of holes or ducts 59 allowing streams of lubricating oil to flow over various regions of the speed reducer.

The housing 60 comprises, on the inner face of the peripheral wall 62, two drips 69 situated vertically in line with the collector 50, the drip 69 taking the form of a material protuberance. The drips 69 make it possible to recover more lubricant within the collector.

A description will now be given, with reference to FIGS. 3 to 6, of a speed reducer 1 according to a second embodiment of the invention which differs from the first embodiment in that the first reservoir 51 and the second reservoir 52 of the lubricant receiving and distributing collector 50 are connected via a second gutter 57 conveying the lubricant from the first reservoir to the second reservoir under the effect of gravity. Thus, the first reservoir 51, the second reservoir 52, the first gutter 56 and the second gutter 57 form a common receptacle capable of receiving the lubricant projected within the housing 60.

The lubricant receiving and distributing collector 50 comprises a central opening 53 into which the first toothed wheel 11 is partially inserted so as to be able to project lubricant from the toothing towards the lubricant receiving and distributing collector. The inner perimeter 53a of the central

Figure 5:
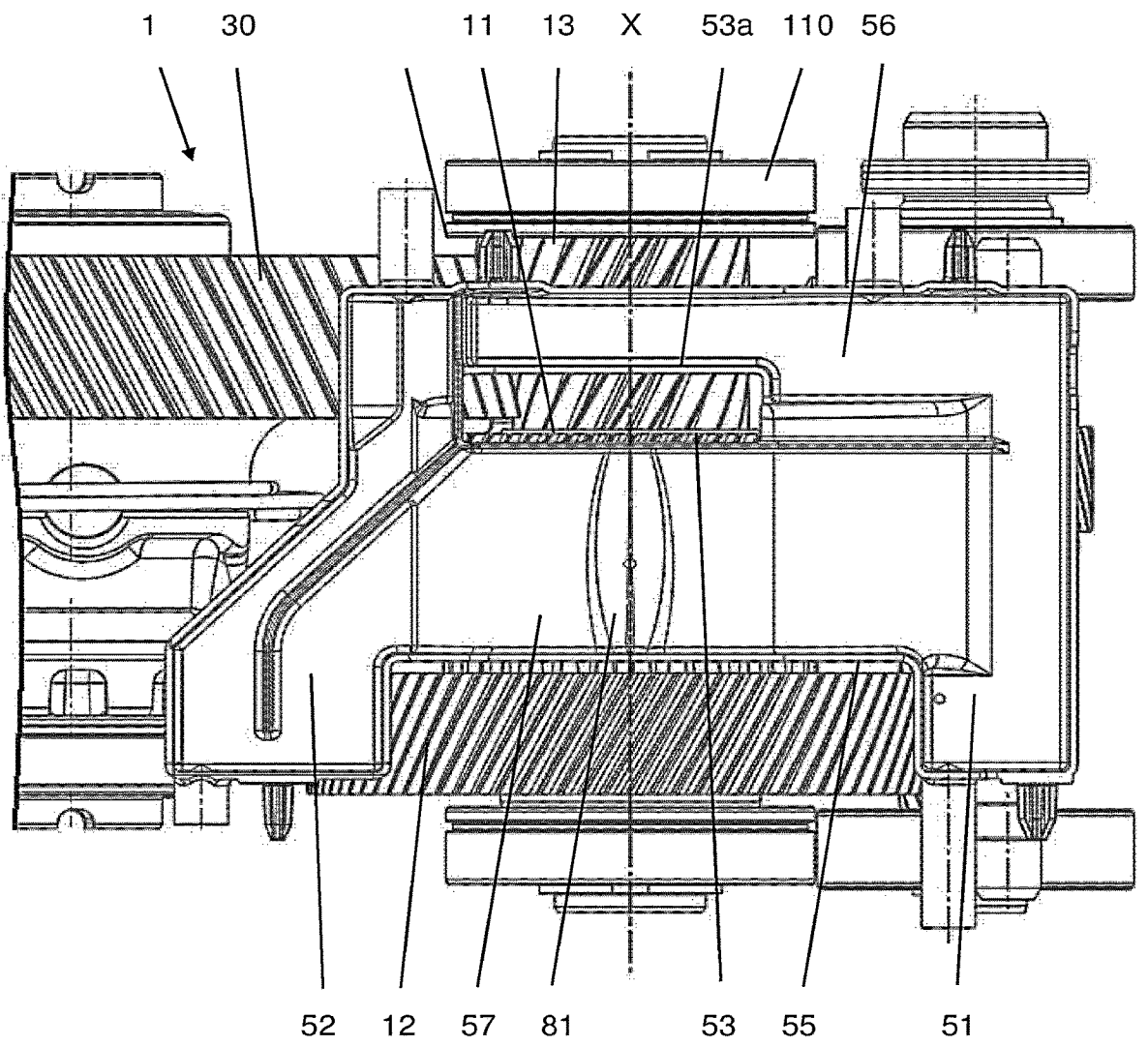
FIG. 5: illustrates a top view of the speed reducer according to the second embodiment of FIG. 3.

7 opening 53 delimits the inner walls of the collector. As illustrated in FIG. 5, the inner perimeter 53a has a rectangular shape in a top view.

The speed reducer 1 according to this second embodiment has two speed ratios. It comprises in particular:

an input shaft 100 intended to be driven by a motor, in particular an electric machine, about a third axis of rotation X3, a second shaft 120 extending along a second axis of rotation X2 and coaxially carrying a differential input wheel 30, and also a differential axle capable of rotating two half-shafts about a second axis of rotation X2, an intermediate shaft 110 movable in rotation about the first axis of rotation X, and capable of transmitting a torque between the input shaft 100 and the differential input toothed wheel 30.

The input shaft 100 is capable of being driven coaxially by a rotor shaft of an electric machine, in particular by means of splines.

The differential input toothed wheel 30 drives the differential axle in rotation about the axis of rotation Y in a known manner. The differential input toothed wheel 30 is the drive wheel of the differential drive device.

The axes of rotation X, X2 and X3 are parallel.

The speed reducer 1 comprises a first double reduction stage E1 between the input shaft 100 and the intermediate shaft 110 and a second reduction stage E2 between the intermediate shaft 110 and the differential input toothed wheel 30.

The first double reduction stage E1 comprises:

on the one hand, for the first ratio, a first pinion 101 locked in rotation with the input shaft 100 with respect to the axis of rotation Z and a second toothed wheel 12 meshing with the first pinion 101 and capable of rotating the intermediate shaft 110 about the axis of rotation X; and on the other hand, for the second ratio, a second pinion 102 locked in rotation with the input shaft 100 with respect to the axis of rotation Z and the first toothed wheel 11 meshing with the second pinion 102 and capable of rotating the intermediate shaft 110 about the axis of rotation X.

The change of speed ratio occurs at the first double reduction stage E1 by means of a gear selection device (not shown).

Thus, the first shaft 110 corresponding to the intermediate shaft coaxially carries a plurality of toothed wheels, the first toothed wheel 11, the second toothed wheel 12 and an output pinion 13 kinematically connected to the differential input toothed wheel 30.

The reduction device 10, in particular the bearings supporting the shafts 100, 110, the meshing between the pinions 101, 102 and the toothed wheels 11, 12, the meshing between the output pinion 13 and the differential input toothed wheel 30 and also the dog clutch sleeve require lubrication, in particular with oil. Here, the lubrication of the reducer is passive. In other words, it does not comprise a pump dedicated to circulating a lubricant within the reducer. The lubrication is therefore based here on the presence of an oil bath at the bottom of the reducer and on conveying this oil in the direction of the various elements of the reducer to be lubricated (bearings, meshing gears, dog-coupling toothings) by virtue, in particular, of the projections of oil caused by the rotation of the differential input wheel 30, of the pinions 101, 102, 13 and of the toothed wheels 11, 12, and by virtue of gravity.

When the vehicle is stationary, a lower portion of the differential input toothed wheel 30 is immersed in the oil bath. When the vehicle is in motion, the differential input toothed wheel 30 rotates about the second axis of rotation X2, which makes it possible to disperse oil, in particular to cause it to rise, as indicated by the arrow F. The oil level at the bottom of the reducer is indicated by the reference NN.

In order to improve the passive lubrication of the reducer, a deflector 20 is arranged in the lower part of the reducer to promote the rising of the lubricant, and a lubricant receiving and distributing collector 50 is arranged in the upper part so as, on the one hand, to receive the lubricant which has been raised beforehand and, on the other hand, to redirect the lubricant to various points on the speed reducer, in particular by gravity. The deflector 20 makes it possible in particular to guide the projection of oil onto the first toothed wheel 11.

Figure 4:
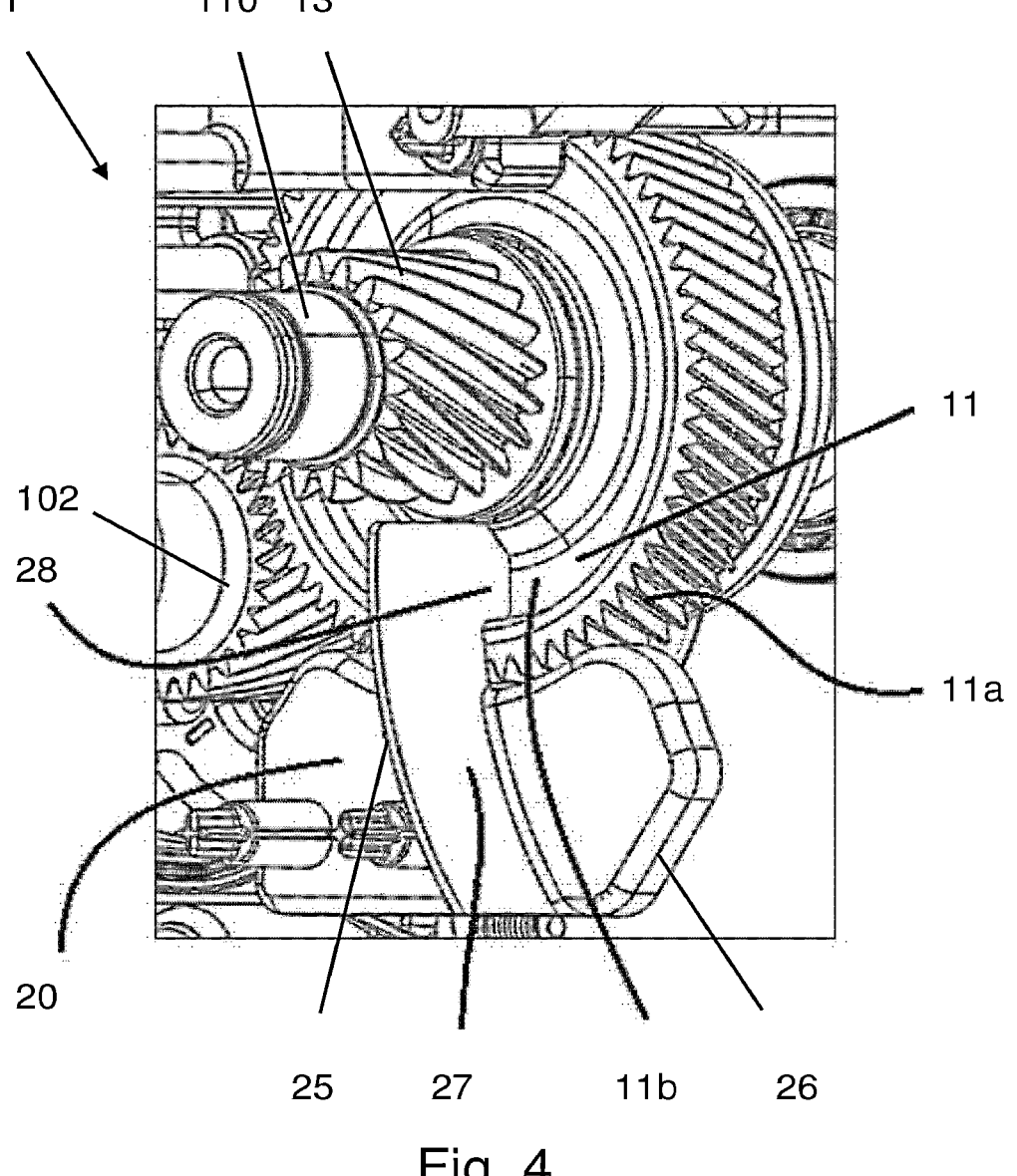
FIG. 4: illustrates a detail view schematically showing the mounting of the deflector of the second embodiment in the housing (without the input wheel of the differential).

In this embodiment, the cooperation of the deflector 20 and the first toothed wheel 11 of the second ratio is shown in FIG. 4.

The first toothed wheel 11 of the second ratio comprises an annular groove 11b arranged about the axis of rotation X and open axially on one of the sides of the first toothed wheel 11.

The deflector 20 comprises a ramp 25 capable of guiding the lubricant. A portion of the ramp 25 is arranged inside the annular groove 11b of the first driven wheel 11. The ramp 25 is configured to direct the lubricant into the annular groove so that the lubricant is centrifuged by the toothed wheel and thus redirected towards the top of the speed reducer.

The ramp 25 comprises in particular a cylindrical lubricant guide surface which is concentric with the differential input toothed wheel 30 and a flow sector 28 situated at the end of the ramp 25 and housed in the hollowed-out flank 11b of the first toothed wheel 11.

The lower edge of the ramp 25 is preferably arranged below the oil level, in particular below the nominal level NN. The nominal level corresponds to the indicative oil level inscribed on the reducer when the vehicle is stationary. Alternatively, the nominal level may correspond to the horizontal plane passing through the lower edge of the opening intended for filling/emptying the reducer. The first toothed wheel 11 of the second ratio is for its part arranged completely above the nominal oil level.

The output pinion 13 of the intermediate shaft 110 is arranged beyond an upper end of the ramp 25 of the deflector 20.

The deflector 20 also comprises a mounting portion 26 extending substantially in a plane perpendicular to the axis of rotation X. The mounting portion 26 also comprises a plurality of fixing studs 29 cooperating with receptacles 63 arranged in the housing 60 of the reducer. The fixing studs 29 project from the mounting portion 26.

The reduction device 10 is generally housed in a closed enclosure formed by the housing 60 and a closure cover 70.

The housing 60 and a closure cover 70 are assembled together and enclose the reduction device 10. The housing 60 may also form all or part of the housing of the electric machine.

In this second embodiment, the speed reducer 1 also comprises a lubricant receiving and distributing collector 50 arranged in the housing 60 between the peripheral wall 62 and the first axis of rotation X. This collector 50 has the particular feature of comprising a first reservoir 51 and a second reservoir 52 which are arranged on either side of the first toothed wheel.

As illustrated in FIGS. 4 and 5, the first reservoir 51 and the second reservoir 52 are connected via a first gutter 56 and a second gutter 57 conveying the lubricant from the first reservoir to the second reservoir under the effect of gravity. Thus, it is possible to distribute the lubricant to various regions of the collector. In this collector 50, the first gutter 56 and the second gutter 57 are spaced axially along the first axis of rotation X and arranged on either side of the central opening 53 to allow the projections of lubricant coming from the toothing of the first toothed wheel to pass through. In this example, the collector is O-shaped. The two reservoirs 51, 52 extend parallel to the axis of rotation X. The collector 50 comprises a plurality of holes or ducts 59 allowing streams of lubricating oil to flow over various regions of the speed reducer.

The collector 50 is held in position partially by the housing 60 and partially by the closure cover 70. The housing 60 thus comprises two mounting receptacles 63 cooperating with two fixing studs 59 of the collector and the closure cover 70 comprises two other mounting receptacles 63 cooperating with two other fixing studs 59 of the collector.

The peripheral wall 62 of the housing 60 participates in the recovery of lubricant by being arranged in the vicinity of the upper part of the collector, the lubricant falling back into the collector by gravity. The collector occupies a central position within the speed reducer, which enables it to receive all the lubricant projections coming from the first toothed wheel but also from other toothed wheels also present within the speed reducer.

Figure 6:
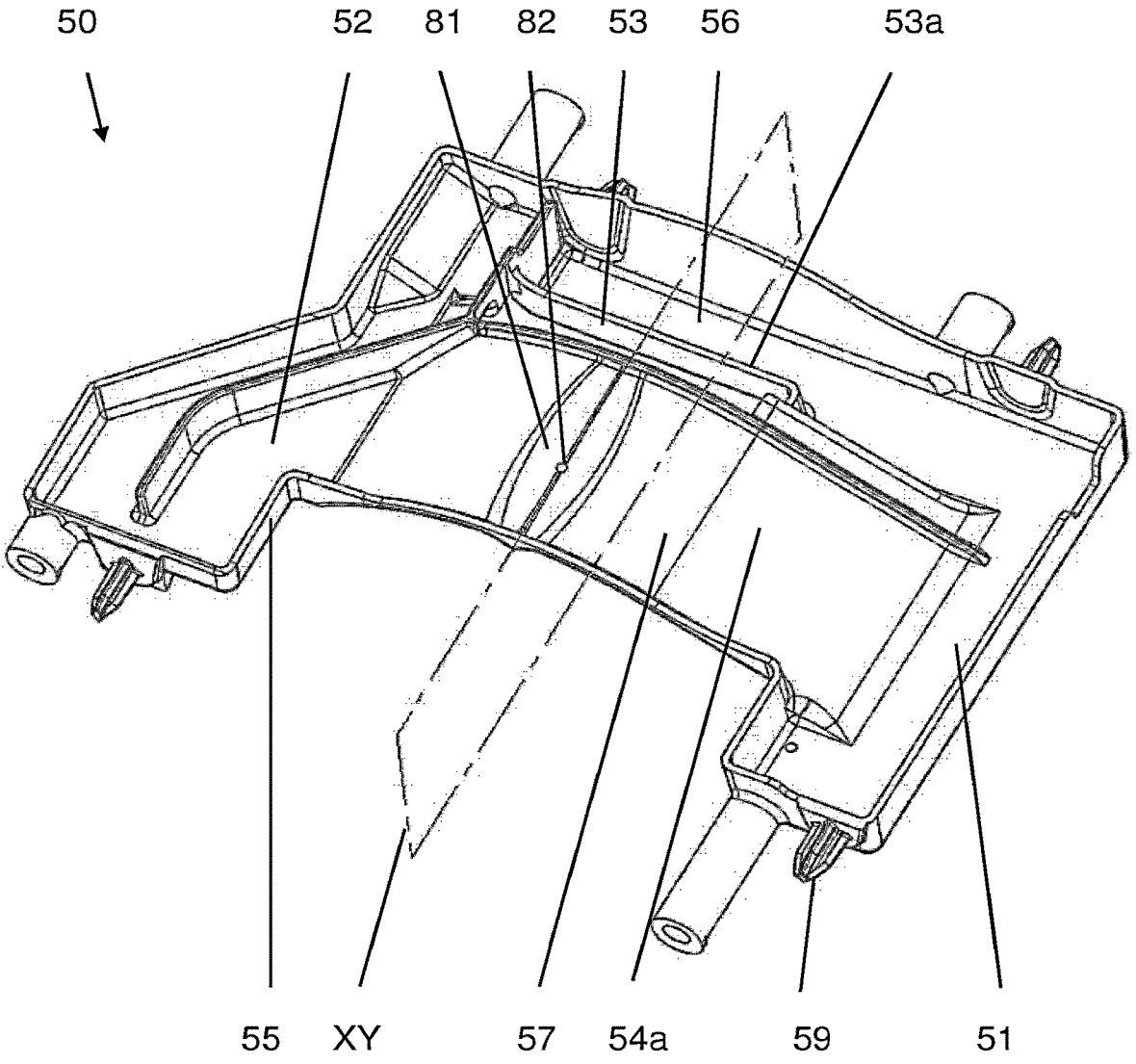
FIG. 6: illustrates an isometric view of the collector of the speed reducer according to the second embodiment of FIG. 3.

Advantageously, the lubricant receiving and distributing collector 50 comprises a notch 55 for the passage of the second toothed wheel 12 movable in rotation about the first axis of rotation X. The notch ensures partial passage of the second toothed wheel 12 between the two reservoirs 51, 52. It is then possible to recover lubricant projected by this second toothed wheel 12 also. In this example, the first shaft 110 coaxially carries a plurality of toothed wheels, including the first toothed wheel 1 and the second toothed wheel 12, the collector 50 covering the outer periphery of at least one of the toothed wheels. In the present case, the collector 50 covers the outer periphery 11a of the first toothed wheel 12 via a cylindrical surface portion 54a. As illustrated in FIG. 6, the cylindrical surface portion 54a forms the bottom of the gutter 57.

This cylindrical surface portion 54a comprises a concave shape 81 situated on the top of the oil retention collector 50. A hole 82 is formed in the centre of this concave region 81 in order to allow a stream of lubricating oil to flow over a precise region of the speed reducer.

Figure 7:
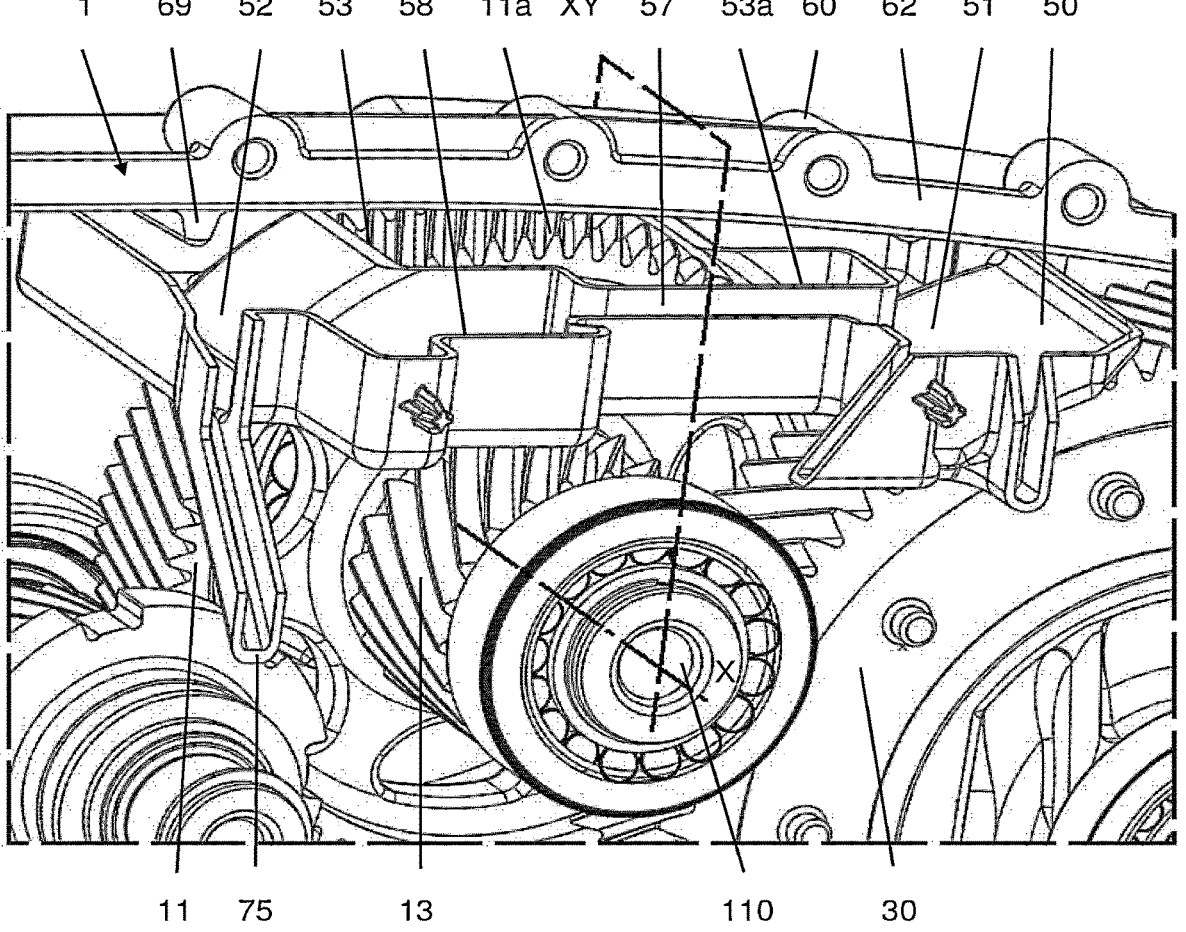
FIG. 7: illustrates a partial front view of a speed reducer according to a third embodiment.

A description will now be given, with reference to FIG. 7, of a speed reducer 1 according to a third embodiment of the invention which differs from the first embodiment in that the lubricant receiving and distributing collector 50 comprises a central opening 53 into which the first toothed wheel 11 is partially inserted so as to be able to project lubricant from the toothing towards the receptacle of the collector and in that the outer periphery 11a of the first toothed wheel extends radially beyond the inner perimeter 53a of the central opening.

In this third embodiment, the first reservoir 51 and the second reservoir 52 are connected via a first gutter 56 and a second gutter 57 conveying the lubricant from the first reservoir to the second reservoir under the effect of gravity. Thus, it is possible to distribute the lubricant to various regions of the collector. In this collector lubricant receiving and distributing collector 50, the first gutter 56 and the second gutter 57 are spaced axially along the first axis of rotation X and arranged on either side of the central opening 53 to allow the lubricant projections coming from the toothing of the first toothed wheel 11 to pass through. The lubricant receiving and distributing collector 50 comprises a plurality of ducts 75 allowing streams of lubricating oil to flow over various regions of the speed reducer.

The duct 75 comprises a bottom and two rims which guide the lubricant as close as possible to the region of the reducer to be lubricated. The outlet of the duct 75 is located below the bottom of the reservoir of the collector.

Advantageously, the housing 60 comprises, on the inner face of the peripheral wall 62, a drip 69 situated vertically in line with the collector 50, the drip 69 taking the form of a material protuberance. In this example, the profile of the drip 69 is linear and oriented in the direction of demolding of the housing 60 obtained by casting. The drip 69 makes it possible to recover more lubricant within the collector 50. The lubricant which trickles along the peripheral wall preferentially returns to the collector by following the shape of the drip rather than returning directly to the bottom of the speed reducer. The lubricant falls back into the collector by flowing drop by drop from the drip 69.

In the various embodiments described here, the deflector 20 makes it possible to raise the oil in a central region of the reducer that is nevertheless congested by the intermediate shaft 110, the toothed wheels 11, 12 and the output pinion 13.

Of course, the invention is described in the foregoing by way of example. It will be understood that a person skilled in the art is capable of producing various alternative embodiments of the invention without thereby departing from the scope of the invention. For example, the invention which has been described here in the context of a speed reducer with a single ratio may also be applied to a speed reducer with two speed ratios or more than two ratios. The invention may also be applied to gearboxes.

It is to be noted that all the features, as they appear to a person skilled in the art on the basis of the present description, the drawings and the accompanying claims, even if in practice they have only been described in relation to other features determined both individually and according to any combination, may be combined with other features or groups of features disclosed herein, provided that this has not been expressly excluded or that technical circumstances make such combinations impossible or pointless.

The invention claimed is:

1. Speed reducer for a powertrain, comprising, in an orthogonal frame of reference:

a reduction device comprising a first shaft extending along a first axis of rotation and coaxially carrying a first toothed wheel, a housing with a hollow shape comprising a base and a peripheral wall integrally formed with the base, the peripheral wall partially surrounding the reduction device, a lubricant receiving and distributing collector arranged in the housing between the peripheral wall and the first axis of rotation, wherein the lubricant receiving and distributing collector comprises a first reservoir and a second reservoir which are arranged on either side of the first toothed wheel, wherein the first reservoir and the second reservoir are connected via a first gutter conveying a lubricant from the first reservoir to the second reservoir under the effect of gravity, and wherein the first reservoir and the second reservoir are connected via a second gutter conveying the lubricant from the first reservoir to the second reservoir under the effect of gravity, so that the first reservoir, the second reservoir, the first gutter and the second gutter form a common receptacle able to receive the lubricant projected within the housing.

2. Speed reducer according to claim 1, wherein the outer periphery of the first toothed wheel extends radially beyond the outer perimeter of the first reservoir or the second reservoir.

3. Speed reducer according to claim 2, wherein at least the first reservoir comprises a cylindrical surface portion concentric with the first axis of rotation.

4. Speed reducer according to claim 2, wherein the peripheral wall of the housing comprises a cylindrical surface coaxial with the first axis of rotation that partially surrounds the outer periphery of the first toothed wheel.

5. Speed reducer according to claim 2, wherein the first reservoir and the second reservoir are arranged on either side of a first geometric plane passing through the first axis of rotation and a second axis of the orthogonal frame of reference perpendicular to the first axis of rotation, the first geometric plane passing through the peripheral wall of the housing in a direction substantially perpendicular thereto.

6. Speed reducer according to claim 5, wherein the first reservoir comprises a first bottom and the second reservoir comprises a second bottom, the first bottom being offset axially with respect to the second bottom along a second axis.

7. Speed reducer according to claim 1, wherein at least the first reservoir comprises a cylindrical surface portion concentric with the first axis of rotation.

8. Speed reducer according to claim 1, wherein the peripheral wall of the housing comprises a cylindrical surface coaxial with the first axis of rotation that partially surrounds the outer periphery of the first toothed wheel.

9. Speed reducer according to claim 1, wherein the first reservoir and the second reservoir are arranged on either side of a first geometric plane passing through the first axis of rotation and a second axis of the orthogonal frame of reference perpendicular to the first axis of rotation, the first geometric plane passing through the peripheral wall of the housing in a direction substantially perpendicular thereto.

10. Speed reducer according to claim 9, wherein the first reservoir comprises a first bottom and a second reservoir comprises a second bottom, the first bottom being offset axially with respect to the second bottom along the second axis.

11. Speed reducer according to claim 1, wherein the first gutter and the second gutter are spaced axially along the first axis of rotation and arranged on either side of a central opening to allow the lubricant projections coming from the toothing of the first toothed wheel to pass through.

12. Speed reducer according to claim 1, wherein the first toothed wheel rotates about the first axis of rotation in a preferred direction, the first reservoir facing the first toothed wheel so as to receive a lubricant projected by the toothing.

13. Speed reducer according to claim 1, wherein the reduction device comprises a second shaft extending along a second axis of rotation and coaxially carrying a differential input toothed wheel, the differential input toothed wheel being partially immersed in a lubricant, and a deflector arranged in the housing comprising a ramp able to guide the lubricant in a direction of the first toothed wheel.

14. Speed reducer according to claim 13, wherein the ramp comprises a cylindrical lubricant guide surface which is concentric with the differential input toothed wheel.

15. Speed reducer according to claim 14, wherein the deflector is manufactured from a part separate from the housing and wherein the ramp comprises a flow sector located at an end of the ramp and housed in a hollowed-out flank of the first toothed wheel.

16. Speed reducer according to claim 1, wherein a closure cover is fitted to the housing so as to form a closed enclosure around the reduction device, the lubricant receiving and distributing collector being held in position partially by the housing and partially by the closure cover.

17. Speed reducer according to claim 1, wherein the first reservoir and the second reservoir are connected via the first gutter and the second gutter which are separate and which distribute the lubricant indiscriminately between the first reservoir and the second reservoir under the effect of gravity, so that the first reservoir, the second reservoir, the first gutter and the second gutter form the common receptacle able to receive the lubricant projected within the housing.

18. Speed reducer for a powertrain, comprising, in an orthogonal frame of reference:

a reduction device comprising a first shaft extending along a first axis of rotation and coaxially carrying a first toothed wheel, a housing with a hollow shape comprising a base and a peripheral wall integrally formed with the base, the peripheral wall partially surrounding the reduction device, a lubricant receiving and distributing collector arranged in the housing between the peripheral wall and the first axis of rotation, wherein the lubricant receiving and distributing collector comprises a first reservoir and a second reservoir which are arranged on either side of the first toothed wheel, and wherein the first reservoir and the second reservoir are connected via a first gutter and a second gutter which are separate and which distribute the lubricant indiscriminately between the first reservoir and the second reservoir under the effect of gravity, so that the first reservoir, the second reservoir, the first gutter and the second gutter form a common receptacle able to receive a lubricant projected within the housing.

19. Speed reducer for a powertrain, comprising, in an orthogonal frame of reference:

a reduction device comprising a first shaft extending along a first axis of rotation and coaxially carrying a first toothed wheel, a housing with a hollow shape comprising a base and a peripheral wall integrally formed with the base, the peripheral wall partially surrounding the reduction device, a lubricant receiving and distributing collector arranged in the housing between the peripheral wall and the first axis of rotation, wherein the lubricant receiving and distributing collector comprises a first reservoir and a second reservoir which are arranged on either side of the first toothed wheel, wherein the lubricant receiving and distributing collector comprises at least one bottom, an outer perimeter and a central opening arranged between the first reservoir and the second reservoir, into which opening the first toothed wheel is partially inserted so as to be able to project lubricant from the toothing towards the bottom of the lubricant receiving and distributing collector, the bottom of the lubricant receiving and distributing collector completely surrounding the central opening, and wherein an inner perimeter of the central opening delimits inner walls of the lubricant receiving and distributing collector.

* * * * *